United States Patent

Cooke

[15] 3,655,006
[45] Apr. 11, 1972

[54] REMOTE CONTROL APPARATUS FOR MOTORIZED VEHICLES

[72] Inventor: Wilbur P. Cooke, 218 Sunset Street, Spartanburg, S.C. 29302

[22] Filed: Aug. 8, 1969

[21] Appl. No.: 848,452

[52] U.S. Cl. ............................ 180/77 R, 180/14 A, 74/481, 280/408
[51] Int. Cl. ................................................. B60k 33/00
[58] Field of Search .......................... 180/14, 14 A, 77, 77 C; 280/480; 74/544, 481

[56] References Cited

UNITED STATES PATENTS

| | | | |
|---|---|---|---|
| 1,302,686 | 5/1919 | Lock | 180/14 A |
| 1,408,231 | 2/1922 | Smith | 180/77 |
| 1,629,014 | 5/1927 | Woodin | 180/77 |
| 1,804,257 | 5/1931 | Greenley | 180/14 A |
| 1,563,791 | 12/1925 | Richardson | 180/77 |
| 2,597,379 | 5/1952 | Romel | 74/481 |
| 2,599,376 | 6/1952 | Ehrenberg | 180/77 C X |
| 3,373,628 | 3/1968 | Lake et al. | 74/544 X |

FOREIGN PATENTS OR APPLICATIONS 324,554  11/1957  Switzerland ........................... 280/480

*Primary Examiner*—A. Harry Levy
*Attorney*—Wellington M. Manning, Jr.

[57] ABSTRACT

Apparatus and method for remotely controlling the accelerator and/or the brakes of motorized vehicles that are connected in tandem with one or more additional motorized vehicles. A pedal engaging member having holding brackets incorporated thereon telescopes over the accelerator or brake pedal and extends upwardly and rearwardly from the pedal terminating at an eyelet. A connector is affixed to the eyelet and extends forwardly to the next vehicle in tandem where it may be adjustably and removably affixed to the eyelet of another control member. A forward pulling motion on the connector will thus accelerate or brake all the vehicles in tandem to which the pedal engaging members are attached.

4 Claims, 7 Drawing Figures

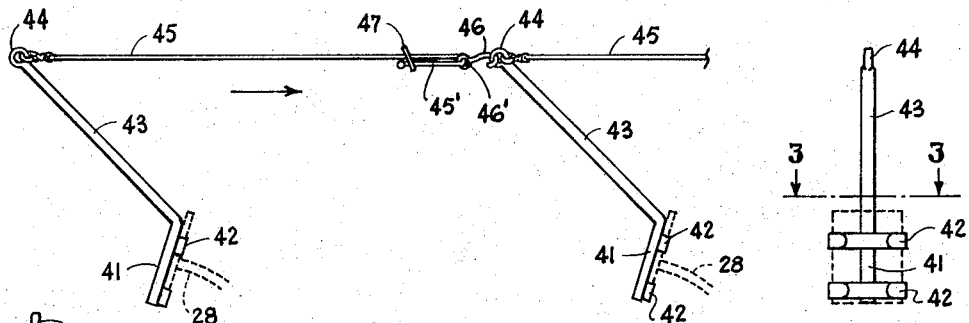
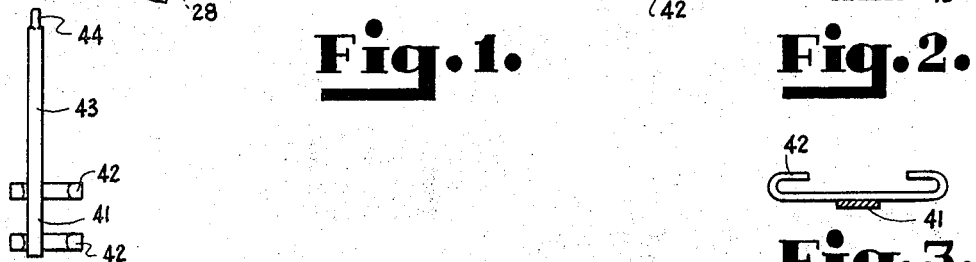
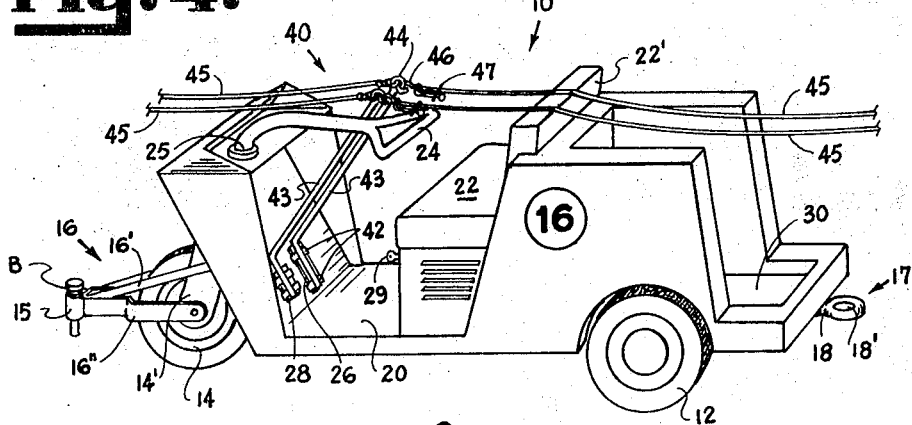
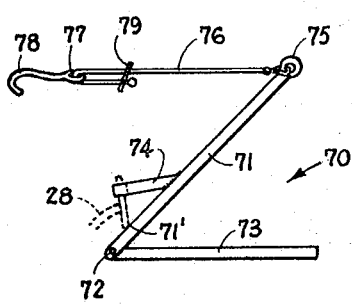
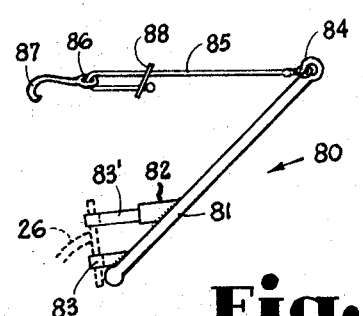
INVENTOR.
WILBUR P. COOKE

REMOTE CONTROL APPARATUS FOR MOTORIZED VEHICLES

BACKGROUND OF THE INVENTION

Small motorized vehicles such as electric golf carts are currently in widespread use at all, or at least the great majority of the golf courses in the United States. Additionally, small electrically powered vehicles are beginning to realize more frequent usage in industry, numerous recreation facilities, and the like. While true, some of these motorized vehicles are gasoline powered, the vast majority are propelled by an electric motor which receives its power from rechargeable batteries, though both may be equipped with the control device of the present invention. Vehicles such as these commonly have one forward gear position and one reverse gear position. The most common usage of these carts is found in a golfing enviornment. The golf carts are used to transport up to two players and two sets of clubs around the course. The batteries utilized in providing the power to the electric golf carts must be recharged after 5 or 6 hours use. Accordingly, the electric golf carts are under normal circumstances used during the day on the course and then returned to a maintenance shed or storage shed for recharging during the night hours. In this manner, the golf cart is normally available for use on a daily basis.

A specific problem that has plagued club managers, maintenance managers, and the like is the transportation of the carts to and from the maintenance shed to make the carts available for use as required and at the same time retain the capability of recharging the batteries overnight. Desirably, the maintenance or storage shed is located remote from the clubhouse proper, to preserve the asthetic appearance of the clubhouse and its immediate surroundings. Up until now, construction of the maintenance shed too far away from the clubhouse has created an untenable situation due to the transportation problems of the carts. An electric golf cart is capable of towing, under its own power, approximately two additional carts on level ground. If, however, the surrounding terrain is hilly, as is often the case on golf courses, then the towing operation becomes very impractical. The single golf cart is not designed to generate sufficient power to pull the additional carts, and also an excessive power drain is experienced from pulling the carts. Thus, the tow cart after having pulled two other carts has depleted its own power reserve to the point that it must be recharged before being used on the golf course. Such an arrangement is both time consuming and produces lost revenue from cart rental.

Golf has fast become a very popular sport and coupled with the continued affluence of society today the number of persons playing golf has increased exponentially. Additional demands are thus being created on the golf course and the facilities attendent thereto. To satisfy the needs of the golfers, each club must maintain a fairly large number of golf carts. Fifty to sixty carts for the ordinary course is not an unreasonable number. If, however, a golf club or country club owns 50 carts and each cart is used during a particular day, then the transporting of the carts, assuming that one cart can tow another two carts requires 16 round trips to and from the clubhouse and maintenance shed in the morning to make the carts available for play and then again in the evening when the carts are returned to the maintenance shed for recharging, etc. This transportation task will, under normal circumstances, require more than 8 man hours each day, thus adding appreciably to the overhead of the club. Further, to enable the club members to have at their ready disposal all of the 50 carts, movement of the carts from the maintenance shed in the morning to the clubhouse must begin well before the tee time when the first cart is needed. Likewise, after the carts have been used, their return to the maintenance shed will require an appreciable amount of time after the last carts have returned to the clubhouse, unless the carts are individually returned to the maintenance shed as they are released by the members.

Improved means for transporting the golf carts between the maintenance or storage shed and the clubhouse is accordingly necessary. Such an improvement could both improve the services available for the members who desire a use of the carts and also substantially reduce the overhead of the club. The controls that are the subject of the present invention provide a system that will economically alleviate the aforementioned transportation problems.

SUMMARY OF THE INVENTION

An object of the present invention is to provide novel apparatus for permitting remote control of an unlimited number of motorized vehicles connected in tandem.

A further object of the present invention is to provide novel apparatus for remotely controlling from a lead motorized vehicle, either acceleration or braking of an unlimited number of motorized vehicles connected in tandem behind the lead vehicle.

Still another object of the present invention is to provide a novel method for remotely controlling acceleration or braking of an unlimited number of golf carts connected in tandem.

Still a further object of the invention is to provide a novel method for remotely controlling, from a lead motorized vehicle, the acceleration and braking of an unlimited number of individual motorized vehicles connected in tandem behind the lead vehicle.

Generally speaking, the apparatus of the present invention comprises a control member adapted to engage a pedal, said control member extending upwardly and rearwardly from said pedal, said control member having a connector attached thereto whereby movement of the connector forward of said control member will depress the pedal to which said control member is attached.

More specifically, the control member comprises a base having a plurality of pedal engaging fingers extending therefrom, said base being extended upwardly and rearwardly from said fingers and terminating at an eyelet, said control member having a connector attached to said eyelet and extending forwardly therefrom, said connector having an eyelet engaging member at its terminal end opposite the eyelet and having means for adjustment of the length of said connector.

The appropriate apparatus for actuating either the accelerator or the brake pedal for the electric carts is basically the same from a functional standpoint. The specific apparatus does, however, differ as to size and shape, each being tailored to receive the particular pedal, whether an accelerator pedal or a brake pedal. Moreover, the different cart manufacturers employ accelerator and brake pedals of different sizes and shapes and therefore the apparatus of the present invention may be modified to fit the pedals of the various carts without departing from the scope of this invention.

In using the present invention each of the golf carts, or the like, is connected in tandem to the cart before and after it. These tandem connections permit the lead cart to be steered while all of the succeeding tandemly connected carts will follow the particular path of travel of the lead cart. Many, if not all, of the succeeding carts in line are equipped with the apparatus of the present invention whereby the connector for the accelerator pedal on one cart is attached to the control member for the accelerator on the cart next closest to the lead cart. The same arrangement is utilized for the brake pedals, whereby the driver of the lead cart has only two connectors to be concerned with, namely, one accelerator connector and one brake connector. A pulling action by the driver of the lead cart will accordingly depress all of the accelerators of the succeeding carts that are equipped with the present control apparatus. On the other hand, if the situation demands, the driver of the lead cart may apply the brakes on all of the succeeding control equipped carts by pulling on the brake connector.

There is no limit to the number of carts that may be connected in tandem and remotely operated according to the teachings of the present invention. The only practical limiting factors are the space available for connecting the carts in tandem and the strength of the driver of the lead cart for pulling the accelerator connector or the brake connector sufficiently to depress either the accelerator or brake pedals of all the succeeding carts. As to the strength factor for pulling the accelerator or brake connectors, it is within the realm of this invention to connect in tandem a large number of carts and to remotely control only a portion of these carts. The partial remote control may be accomplished by utilizing the apparatus of the present invention only on a sufficient number of carts to provide the motive power for pulling the whole chain, or as the case may be, utilizing the apparatus of the present invention on alternate carts whereby every other cart provides both a pushing and pulling force to the chain. It is preferred, however, especially where substantial grades must be negotiated by the carts that every cart be equipped with the apparatus of the present invention.

The method of the present invention generally encompasses the steps of connecting a series of motorized vehicles in tandem, operatively associating the accelerator and brake pedals of one cart to the accelerator and brake pedals of the cart next adjacent and closest to the lead cart, driving the lead cart and simultaneously remotely controlling the desired pedal of each controlled cart in the line.

The preferred embodiment of the present invention as well as an appreciation of all the objects of the present invention may be readily ascertained by one skilled in the art by reading the detailed description of the invention in connection with the accompanying drawing.

DESCRIPTION OF THE DRAWING

FIG. 1 shows a side view of control members of the present invention that are associated for remote control.

FIG. 2 is a rear view of a control member of the present invention.

FIG. 3 is a view taken along line 3—3 and shows the section of a control member that engages the pedal.

FIG. 4 shows a control member of the present invention where the base is offset from the center of the pedal engaging fingers.

FIG. 5 shows a typical golf cart having control members of the present invention affixed to the brake and accelerator pedals thereof.

FIG. 6 shows a modification to a control member adapted for a brake pedal.

FIG. 7 shows a modification to a control member adapted for an accelerator pedal.

DESCRIPTION OF THE PREFERRED EMBODIMENTS

Referring to the drawings, and particularly to FIGS. 1–5 a preferred embodiment of the present invention may be seen. A motorized vehicle such as the typical golf cart is shown in FIG. 5 and is indicated generally as 10. Cart 10 is equipped with two rear wheels 12 and one front wheel 14 to which is attached a hitch indicated generally as 16. The cart body is open and generally comprises a cockpit 20 and a bag storage area 30. Cockpit 20 is provided with a seat 22 on which the occupants sit, a tiller 24 for steering the golf cart, an accelerator pedal 26, a brake pedal 28, a key 29 that operates a switch (not shown) and incidental storage area indicated generally as 25. In operating the cart, the driver normally turns the key 29 to the "on" position, depresses the accelerator pedal 26 and steers the cart by appropriate movement of tiller 24. Braking power to stop the cart is provided by depressing brake pedal 28.

The cart shown in FIG. 5 is equipped with a front hitch generally indicated at 16 and a rear hitch generally indicated as 17. Front hitch 16 may be permanently installed on the cart of may be a removable unit that can be placed on the cart when it is desired to connect several carts in tandem. Hitch 16 is comprised of bar 16' and a pair of supports 16'', each of which is attached to opposite sides of the front wheel support 14'. At the forward end of hitch 16 is an opening (not shown) in a collar 15 having a bolt B residing therein.

The rear hitch 17 of cart 10 is merely a member 18 permanently secured to the cart and terminating as eyelet 18'. In connecting a series of carts in tandem the front hitch 16 of one cart is connected to the rear hitch 17 of the next adjacent cart. The union is accomplished by positioning hitches 16 and 17 such that the openings are vertically aligned while bolt B has been removed from collar 15 and then inserting bolt B through opening 15 of hitch 16 and eyelet 18' of hitch 17. The front hitch of the following cart can then be affixed to the rear hitch of the present cart in the similar manner and the tandem connections can be made as desired.

In remotely controlling the following tandemly connected carts, a control member generally indicated as 40 is provided. Control member 40 is in essence a pedal engaging member comprising a base 41 having permanently secured thereto a series of outwardly extending pedal encircling fingers 42. Base 41 is connected at its upper end to an upwardly and rearwardly extending bar 43 which has at its terminal end an opening shown as an eyelet 44. A connector 45 is secured at one end to eyelet 44 and extends forwardly therefrom. Connector 45 is affixed at its opposite end to a hook 46 the purpose of which will be described hereinafter. Connector 45 is attached to hook 46 in the manner so as to render connector 45 adjustable in length. The adjustability is achieved by passing connector 45 through an opening 46' of hook 46 and running a portion 45' of connector 45 rearwardly to a connector adjusting member 47.

As mentioned earlier due to the varying sizes of accelerator pedals and brake pedals on each cart and additionally to the different sizes and shapes of the pedals on the various carts, only one of the remote control devices will be described, it being evident to one skilled in the art that this device can be modified in line with the present teachings to operatively fit any of the cart pedals. One example of the variation that is required is found when using a cart having a steering wheel and column for steering purposes instead of the tiller 24 as is shown in FIG. 5. The presence of the steering column interferes with the ordinary operation of the remote control apparatus. Accordingly, a control member as shown in FIG. 4 wherein the base 41 and bar 43 are laterally offset from center to remove bar 43 from the normal line of the steering column. In this particular situation, fingers 42 on opposite sides of base 41 will be of a different length.

In operation, a control device 40 is fitted over the brake and/or accelerator pedal 26 or 28 as may be seen in FIGS. 1 and 5. In FIG. 1 a brake pedal 28 is shown in phantom and it may be readily seen that the control device 40 is slipped over the top of the brake pedal, with base 41 residing on the outward side of the brake pedal and fingers 42 passing around the side and engaging the rear side of the brake pedal, thus holding the control device 40 on brake pedal 28 and allowing operation of the control device to depress brake pedal 28. Referring to FIG. 5, control devices 40 are seen mounted on brake pedal 28 and accelerator pedal 26 with the bar of each device extending upwardly and rearwardly from the pedal and terminating at the eyelets 44. From eyelets 44 connectors 45 extend forwardly to the next cart, where they will pass over the storage area 30 and the back portion 22' of seat 22 of the cart and will then engage eyelets 44 of the control devices of the next cart. After connecting hook 46 to eyelet 44 of the next cart, the connector 45 should be tightened by movement of holding member 47 to lengthen or shorten connector 45 to render connector 45 taut.

Each of the carts hooked in tandem may possess the control devices 40 as shown in FIG. 5 whereby all of the accelerator pedals of all of the carts are connected in series to be actuated simultaneously upon the forward pulling of connector 45 by the driver of the lead cart. Similarly, all of the brake pedals of all of the carts in tandem may be connected in series and may be actuated upon a forward pulling of connector 45 by the driver of the lead cart.

The complete operation of transporting carts according to the present invention thus encompasses the connecting of the carts together in tandem by joining front hitch 16 of one cart to rear hitch 17 of the next cart, applying control devices 40 to the accelerator and/or brake pedals 26 and 28 of cart 10 and turning on the ignition switch of cart 10. When all of the carts are connected in tandem with the control devices in place there will be in essence a continuing brake and/or accelerator from the last cart to the lead cart with the connectors in the lead cart lying in the lap of the driver. The driver of the lead cart now needs only to depress the accelerator of his cart while steering same and to pull the connector 45 that is operatively associated with the accelerator pedals of the following carts. As the train of carts proceeds it may become necessary to slow the carts down due to a bumpy condition of the surface over which they are traveling or to brake the speed of the carts to go down a hill. This deceleration is accomplished by pulling connector 45 that operatively associates all of the brake pedals of the train of carts. Once the carts have reached their destination the control devices are simply disconnected and lifted off the pedals and the carts disconnected from each other at their hitches. Each individual cart is now ready for its intended use.

In using the control apparatus of the present invention it may be determined preferable to utilize only the accelerator pedals of the carts in tandem for movement of the carts to and from a particular location. This feature is prevelant in flat smooth terrain or in a hilly terrain where the only direction of travel to the intended destination is uphill. Ever in the hilly terrain, however, when the direction is uphill it should be remembered that brakes would be required if for some reason the carts starting rolling back down the hill. Accordingly even in this situation it is preferred that both brake pedal and accelerator pedal have the novel control apparatus attached thereto and in use.

FIG. 6 and 7 portray a further embodiment of the present invention. In FIG. 6 is shown a control device generally indicated as 70 that is suitable for controlling the brake pedal of a cart such as shown in FIG. 5. Control device 70 comprises a base member 71 to which is hingedly connected at point 72 a member 73. Base 71 has connected thereto a strap 74 which is designed to fit over the brake pedal 28 as shown in phantom and hold the control device thereto. Base 71 has at its upper end a member 75 to which is affixed a connector 76. Connector 76 extends forwardly and passes through the eyelet 77 of a hook 78 and then returns in the opposite direction to connector holding member 79 which is used to vary the length of the connector 76. In use the remote control device 70 is applied to the brake pedal by resting member 73 on the floor of the cart and extending base 71 upwardly where it contacts the bottom of brake pedal 28 as at point 71'. Strap 74 is then positioned over the top of brake pedal 78 and the control device 70 is thereafter connected as was described with reference to the control device shown in FIGS. 1–5. A forward pulling of connector 76 causes the brake pedal 28 to depress, thereby slowing down or stopping the cart.

FIG. 7 shows a modified control device 80 for use with accelerator pedals. Device 80 comprises a base 81 having a support 82 extending diagonally therefrom. Base 81 and diagonal support 82 have straps 83 and 83' connected thereto, the purpose of which will be hereinafter described. Base 81 terminates at its upper end at an eyelet 84 to which is affixed connector 85. Connector 85 extends forwardly and passes through eyelet 86 of hook 87 and then returns parallel to itself and terminates at connector holding member 88. In use, control device 80 is applied to the accelerator pedal by sliding straps 83 over the pedal whereby base 81 at its lower end rests on the cart floor, and whereby diagonal support 82 is adjacent the upper portion of accelerator pedal 26 shown in phantom. Thereafter the control device is connected to the control device of other carts or to the lead cart as was described hereinbefore. In operation a forward pulling of connector 85 brings support 82 into contact with accelerator pedal 26 to depress same and supply motive power to the electric cart.

The control devices of the present invention have been described with reference to their construction and use with an electric golf cart. These control devices may be of unitary construction or may be adjustably connected to facilitate accepting the various size pedals. Moreover, the control device is shown in all Figures to have pedal engaging fingers or straps that do not extend the full length of the pedal. Obviously these fingers or straps could be solid instead of having a plurality of same. Additionally the connector members are shown to be adjustable by the movement of a connector holding member along the connector. Obviously the method of adjustability of the connectors is up to the discretion of the ordinary man skilled in the art and while a rope is normally employed, a light chain with a detachable hook could likewise be employed wherey the adjustability of the chain could be maintained by moving the hook from link to link, etc. Further, while a hook 46 is shown in the drawings, any suitable means may be employed to join connector 45 of one control device to eyelet 44 of another control device; such as for instance a spring loaded latch that would removably lock the connector to the eyelet.

The materials of construction for the control devices of the present invention are not critical so long as the material is sufficiently rigid to, when the pulling force is applied, depress the particular pedal on which it is positioned.

The remote control device of the present invention has been described with reference to the transportation of electric golf carts. Obviously there are other motorized vehicles that could be transported or remotely controlled by the teachings of the present invention. Moreover, those skilled in the art will obviously envision modifications and deviations from the preferred embodiments of the invention that still fall within the scope of the invention. Accordingly the scope of the invention should be dictated only by the breadth of the appended claims.

What is claimed is:

1. A train of motorized golf carts or the like comprising:
   a. a lead cart;
   b. a plurality of following carts, each following cart being connected in tandem to the next adjacent forward cart, all of said carts having at least one pedal for controlling individual movement thereof; a plurality of said following carts having a remote control device removably secured to a pedal therein, said remote control devices comprising a pedal engaging member, said pedal engaging member extending upwardly from said pedal and having a connector secured at the upper end thereof, said connector extending outwardly therefrom and having hook means at an opposite end thereof, said connector further having an adjustment member received therearound intermediate its length, said connector passing through said adjustment member, through a portion of said hook means and returning and secured at a further portion of said adjustment member, said adjustment member being movable along said connector to vary the length thereof; said hook means being removably secured to the upper end of the pedal engaging member of a next adjacent remote control device and the connector of the remote control device nearest the lead cart being available for manipulation from said lead cart, whereby movement of the connector at the lead cart causes a corresponding movement of the pedal engaging member of each remote control device associated therewith.

2. A train of motorized golf carts or the like as defined in claim 1 wherein the pedal engaging member of the remote control devices comprises a base, at least one finger secured to said base and extending outwardly from opposite sides thereof, said finger being curved at both outer ends and extending back toward said base, and a bar secured to said base and extending upwardly therefrom.

3. A train of motorized golf carts or the like as defined in claim 2 wherein said bar terminates at its upper end as an eyelet.

4. A train of motorized golf carts or the like as defined in claim 3 wherein said connector is rigidly secured at said eyelet.

* * * * *